US008407151B1

(12) United States Patent
Agarwal et al.

(10) Patent No.: US 8,407,151 B1
(45) Date of Patent: Mar. 26, 2013

(54) SYSTEM AND METHOD FOR GENERATING SHIPMENT FORECASTS FOR MATERIALS HANDLING FACILITIES

(75) Inventors: Richa Agarwal, Issaquah, WA (US); Thomas Yves Paul Helleboid, Seattle, WA (US); Shyam Mishra, Bellevue, WA (US); Lin Wan, Bellevue, WA (US); Simon M. Patrick, Seattle, WA (US); Jin Lai, Beijing (CN); Michael Mahesh Bhaskaran, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 230 days.

(21) Appl. No.: 12/890,344

(22) Filed: Sep. 24, 2010

(51) Int. Cl.
*G06Q 30/00* (2012.01)
*G06Q 10/00* (2012.01)
(52) U.S. Cl. .................................. 705/330; 705/7.12
(58) Field of Classification Search .................. None
See application file for complete search history.

(56) References Cited

U.S. PATENT DOCUMENTS

| 7,610,214 | B1  |   | 10/2009 | Dwarakanath et al. |        |
|-----------|-----|---|---------|--------------------|--------|
| 7,711,612 | B1  | * | 5/2010  | Farias et al. ...... | 705/28 |
| 2003/0018771 | A1 |   | 1/2003  | Vinberg             |        |
| 2003/0046133 | A1 | * | 3/2003  | Morley et al. ...... | 705/8  |
| 2003/0110104 | A1 | * | 6/2003  | King et al. ......  | 705/28 |
| 2003/0200134 | A1 |   | 10/2003 | Leonard et al.      |        |
| 2003/0216993 | A1 | * | 11/2003 | Goldwerger et al. ... | 705/37 |
| 2005/0288993 | A1 | * | 12/2005 | Weng et al. ........  | 705/10 |
| 2007/0016538 | A1 | * | 1/2007  | Bielefeld et al. ... | 705/410 |
| 2007/0186515 | A1 | * | 8/2007  | Ruetten et al. .....  | 53/502 |
| 2008/0162487 | A1 |   | 7/2008  | Richter             |        |

OTHER PUBLICATIONS

Determining the Number of Containers of Infant Foods to Issue Using Rouding Up with Substation of 1-lb Bananas, USDA, http://www.nal.usda.gov/wicworks/Learning_Center/FP/1lbbanana.pdf, Aug. 26, 2008.*

* cited by examiner

*Primary Examiner* — George Chen
(74) *Attorney, Agent, or Firm* — Robert C. Kowert; Meyertons, Hood, Kivlin, Kowert & Goetzel, P.C.

(57) ABSTRACT

Embodiments may include a forecasting component that, for each of different service levels offered to customers, generates a projection of the quantity of shipments to be shipped according to that service level during a time period. Based on an aggregate quantity of shipments projected to be shipped, projected quantities of shipments for the multiple service levels may be modified. The forecasting component may, for each service level, receive information specifying a distribution of different shipment methods that are projected to be utilized to ship shipments of a particular priority designation to meet requirements of that service level. Based on the distribution for each service level and the modified projected quantity of shipments for each service level, a forecast specifying quantities of shipments that are to be shipped during the time period according to each of the different shipment methods may be generated.

27 Claims, 8 Drawing Sheets

SYSTEM AND METHOD FOR GENERATING SHIPMENT FORECASTS FOR MATERIALS HANDLING FACILITIES

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may operate a facility that prepares shipments of purchased items. A shipment carrier may acquire such shipments from the merchant and deliver the shipments to the respective purchasing customers.

Typically, varying workloads may require varying levels of resources for both merchants and shipment carriers. For instance, if the quantity of orders processed by a facility within the merchant's fulfillment network dramatically increases, the merchant may increase the quantity of labor within the facility in order to prevent processing delays. Similarly, if the quantity of orders processed by that facility substantially decreases, the merchant may decrease the quantity of labor within the facility in order to avoid unnecessary expenditures on labor. Shipment carriers may also tailor their operations dependent upon the workload of merchant facilities. For example, if the quantity of outgoing shipments at a merchant facility substantially changes, the shipment carrier may change the quantity of delivery vehicles sent to that facility to pick up shipments.

While the system and method for generating shipment forecasts for materials handling facilities is described herein by way of example for several embodiments and illustrative drawings, those skilled in the art will recognize that the system and method for generating shipment forecasts for materials handling facilities is not limited to the embodiments or drawings described. It should be understood, that the drawings and detailed description thereto are not intended to limit the system and method for generating shipment forecasts for materials handling facilities to the particular form disclosed, but on the contrary, the intention is to cover all modifications, equivalents and alternatives falling within the spirit and scope of the system and method for generating shipment forecasts for materials handling facilities as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
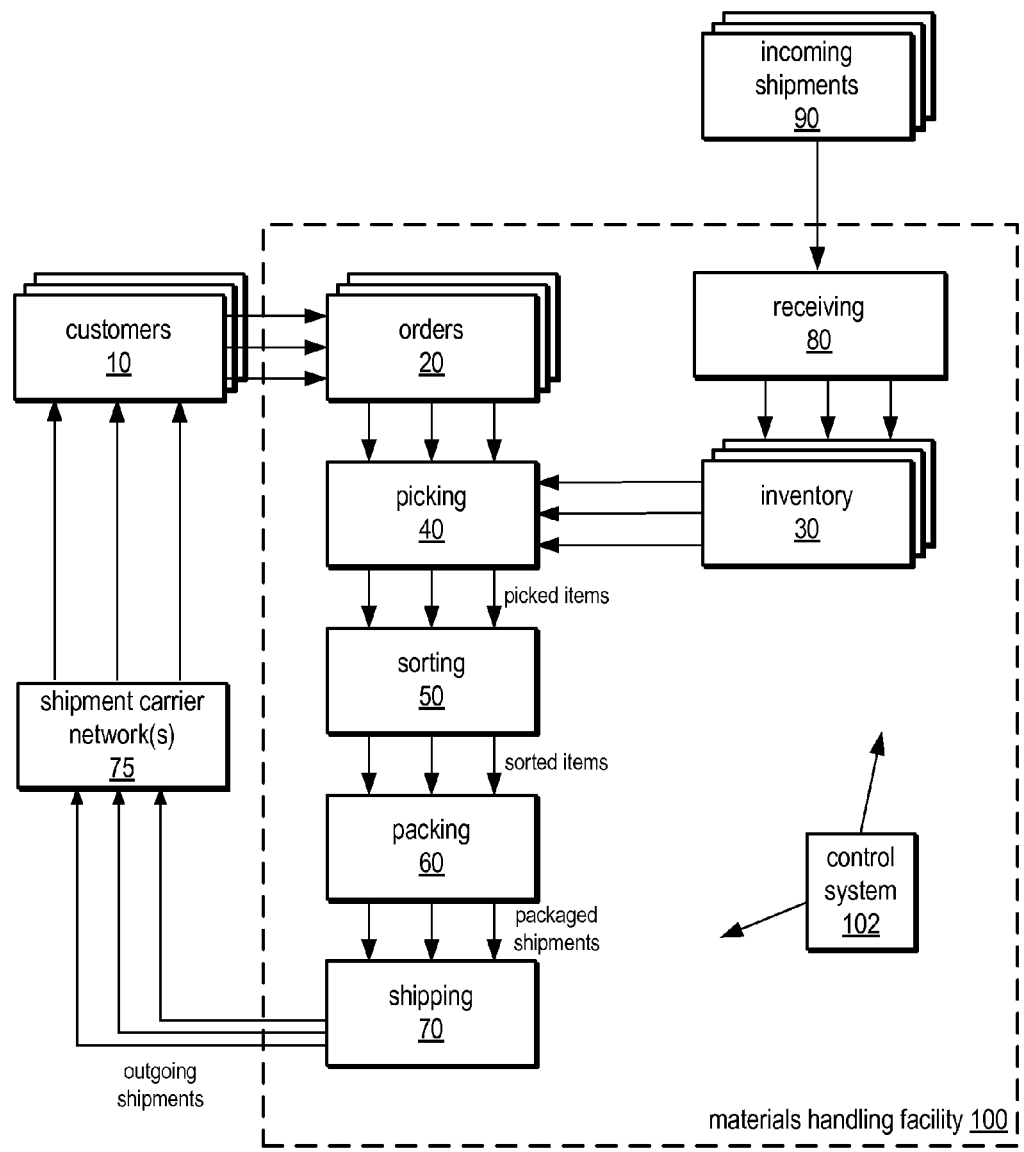
FIG. 1 illustrates a logical representation of the operations of a materials handling facility, according to some embodiments.

Various embodiments of a system and method for generating shipment forecasts for materials handling facilities are described. FIG. 1 illustrates a logical representation or view of the operation of a materials handling facility 100 of various embodiments of the system and method for generating shipment forecasts for materials handling facilities. In various embodiments, a fulfillment network including multiple materials handling facilities (each of which may be configured in a manner similar to that of materials handling facility 100) may be responsible for fulfilling multiple orders, such as orders placed through an electronic commerce ("e-commerce") portal.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 10 may submit orders 20 to the product distributor through an e-commerce portal or other electronic marketplace, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 102). A picked, packed and shipped order does not necessarily include all of the items ordered by the customer; an outgoing shipment to a customer may include only a subset of the ordered items available to ship at one time from an inventory storage location.

A materials handling facility may also include a receiving 80 operation for receiving shipments of stock (e.g., units of inventory items) from one or more sources (e.g., vendors) and for moving or "stowing" the received stock into stock storage (e.g., inventory 30). The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 70 may be transferred to one or more shipment carrier network(s) 75. Each shipment carrier's network may include one or more distribution facilities for storing items (e.g., hubs) as well as vehicles for conveying shipments (e.g., trucks) from such distribution facilities and/or materials handling facilities (such as materials handling facility 100) to various destinations (e.g., customer specified destinations).

While embodiments presented herein are largely described with respect to a single material handling facility (such as materials handling facility 100), it should be understood that embodiments may be configured to generate shipment forecasts for any materials handling facility in a network of multiple materials handling facilities. For instance, various embodiments may be configured to generate shipment forecasts for materials handling facilities in a network of many geographically diverse materials handling facilities.

Figure 2:
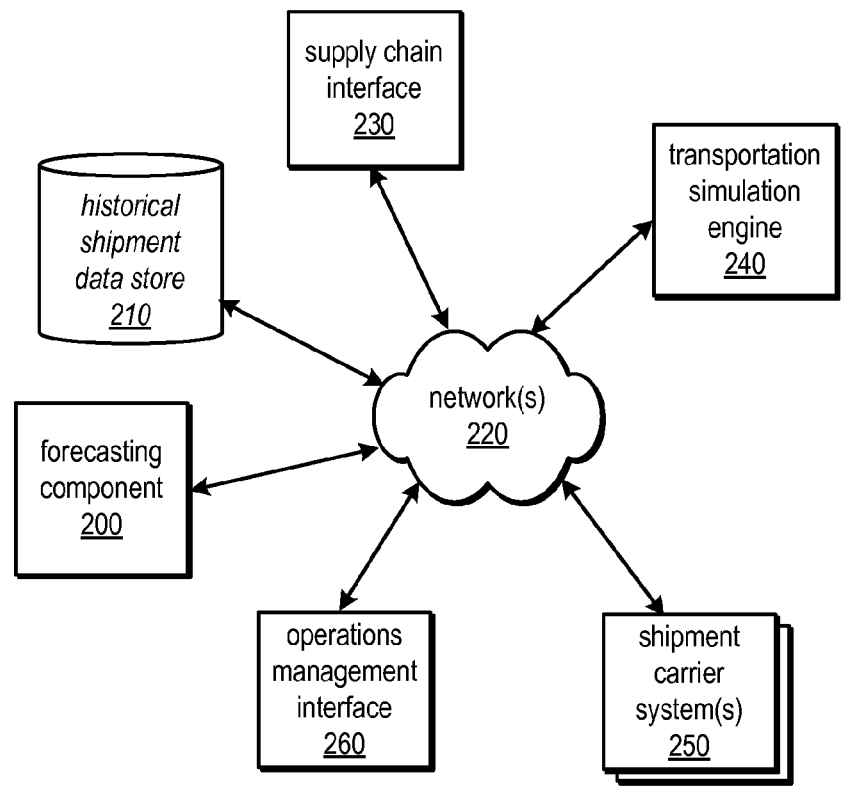
FIG. 2 illustrates an example system configuration including a shipment management component, according to some embodiments.

FIG. 2 illustrates a system configuration for implementing embodiments of the system and method for generating shipment forecasts for materials handling facilities. In various embodiments, any of the illustrated elements may be fully or partially implemented on a computer system, such as computer system 700 of FIG. 7. Embodiments may include a forecasting component 200, which may be configured to generate a shipment forecast that specifies, for one or more periods in time (e.g., one or more days), a quantity of shipments that are projected to be shipped from a materials handling facility, such as materials handling facility 100 described above. Such forecast may also specify a shipment method that is to be utilized to ship a respective quantity of shipments. In various embodiments, a shipment method may be specific to a particular shipment carrier. For instance, one non-limiting example of a shipment forecast for a particular day may specify that 1000 shipments are to be processed by a first shipping company's ground shipping service and that 2000 shipments are to be processed by the first shipping company's two-day air service. In this non-limiting example, that same shipment forecast may also specify that 3000 shipments are to be processed by a second shipment carrier's overnight air service and that 500 shipments are to be processed by the second shipment carrier's ground service. As described herein, a given shipment method may generally be specific to a particular shipment carrier as well as a particular type of service provided by that particular shipment carrier (e.g., overnight shipping, second day shipping, ground shipping, etc.). (Although this need not be the case in all embodiments.)

Forecasting component 200 may utilize various techniques to generate a forecast, examples of which are described in more detail below. In various embodiments, forecasting component 200 may be configured to generate shipping forecasts based (at least partially) on historical shipment data, such as the historical shipment data stored in historical shipment data store 210. Historical shipment data store 210 may in various embodiments store information that indicates, for any time period in the past, multiple shipment methods that were utilized to ship shipments from a respective materials handling facility as well as the quantity of shipments that were shipped according to each of such shipment methods. In various embodiments, historical shipment data store 210 may also store information that indicates, for any time period in the past, multiple shipment service levels (e.g., 2-day shipping, ground shipping, economy shipping, etc.) as well as the quantity of shipments that were shipped according to each of such shipment service levels. As described in more detail below, shipment methods may be carrier specific whereas shipment service levels are not necessarily carrier specific.

In various embodiments, forecasting component 200 may be configured to communicate data or information to/from any illustrated element over one or more network(s) 220, which may be configured in manner similar to that of network 785 of FIG. 7 described below. In general, any illustrated element of FIG. 2 may be configured to communicate data or information to/from any other illustrated element. It should be understood that when a given element is described as receiving information provided by another element, such exchange may occur over one or more network(s) 220.

Supply chain interface 230 may be configured to provide projections of facility output to forecasting component 200. In one non-limiting example, supply chain interface 230 may provide weekly or daily data that specifies a projected output of a given materials handling facility. For a given facility, this output may be expressed in total units expected to be shipped per day, total units expected to be shipped per week, or total units expected to be shipped per some other time period, for example. As described in more detail below, forecasting component 200 may be configured to utilize the information provided by supply chain interface 230 in order to scale initial forecasts generated from historical data. In various embodiments, the projected output information may be generated based on a variety of information, such as estimates or predictions based on historical sales data or predictions as to future sales. While various embodiments describe supply chain interface 230 as providing the above-described information to forecasting component 200, it should be understood that in some embodiments forecasting component 200 may receive such information from other sources or may generate such information independently.

Transportation simulation engine 240 may be configured to, for a given shipment (either an actual shipment or a hypothetical shipment) to be shipped from a materials handling facility, identify the shipment method (e.g., carrier and service) that is to be utilized to ship that shipment. The transportation simulation engine 240 may identify such shipment method according to a variety of techniques including but not limited to evaluating the shipment data (e.g., shipment service level selected for the shipments, shipment dimensions, shipment weight, shipment origin, shipment destination, etc.) and/or evaluating information of various shipment carriers (e.g., carriers services, shipment costs, historical shipping performance data from data store 210, etc.). Additional description as to the manner in which simulation engine 240 selects a particular shipment method for a given shipment is described below with respect to later figures.

Transportation simulation engine 240 may be configured to perform the above-described analysis on multiple shipments. For example, in some embodiments, transportation simulation engine 240 may evaluate a sample of shipments from a population of historical shipments (e.g., shipments from one or more previous weeks or years) from historical shipment data store 210. The results of this sample-based analysis may form a distribution of multiple different shipment methods. In one non-limiting example, such distribution may be a frequency distribution that specifies, for each of multiple shipment methods, the quantity of shipments that were assigned that shipment method by transportation simulation engine 240. In various embodiments, such a distribution may be provided to forecasting component 200. As described in more detail below, forecasting component 200 may utilize such a distribution to create a forecast of the shipment methods that will be utilized to ship multiple shipments.

Forecasting component 200 may be configured to provide such forecast to shipment carrier system(s) 250, each of which may be controlled and/or accessible by a respective shipment carrier. By providing a shipment carrier with a forecast specifying shipment methods and quantities of shipments to be shipped according to those shipment methods, embodiments may make it easier for shipment carriers to plan for future work. For example, in some cases, shipment carriers may use distinct vehicles for different shipments that are picked up from a materials handling facility. For instance, if a shipment carrier is given an accurate or near-accurate daily estimate of the shipments that will need to be shipped and the corresponding shipment methods for those shipments, the shipment carrier may ensure that the proper delivery vehicles (and proper quantities of such vehicles) are dispatched to the materials handling facility to pick up shipments.

Forecasting component 200 may also be configured to provide the forecast to operations management interface 260. In various embodiments, operations management interface 260 may be any computer or electronic device (or some combination thereof) configured to receive and provide information from forecasts and provide such information to one or more users, such as management entities (e.g., agents). In one example, a forecast may be provided to an operations management interface, which may display information from the forecast as a graphical representation on an electronic display accessible to a management entity. In some cases, one or more management interfaces 260 may be included within a materials handling. For instance, a management entity within the materials handling facility may view information from the forecast and perform decisions or tasks based on such information. In one non-limiting example, a management entity responsible for staffing agents at different areas or stations within the materials handling facility may select the locations to which agents are staffed at least in part based on a forecast obtained through an operations management interface. For instance, certain packing and/or preparations stations within the materials handling facility may be associated with expedited shipping methods (e.g., overnight air shipping). Based on the number of shipments to be shipped according to that shipping method (as specified by the forecast), management entities may determine the quantity of agents that should be staffed at those stations. In yet other embodiments, at least some staffing levels within the materials handling facility may be controlled by automated systems (e.g., a computer configured to automatically assign agents to work stations). In these cases, the forecast component 200 may be configured to provide generated forecasts to such automated systems, which may then automatically control staffing levels at various work stations based on the forecasts and without user intervention (or with minimal user intervention). It should be understood that, in other cases, the forecasts generated by forecast component 200 may be provided to other systems and/or utilized for other purposes than those described herein.

Figure 3:
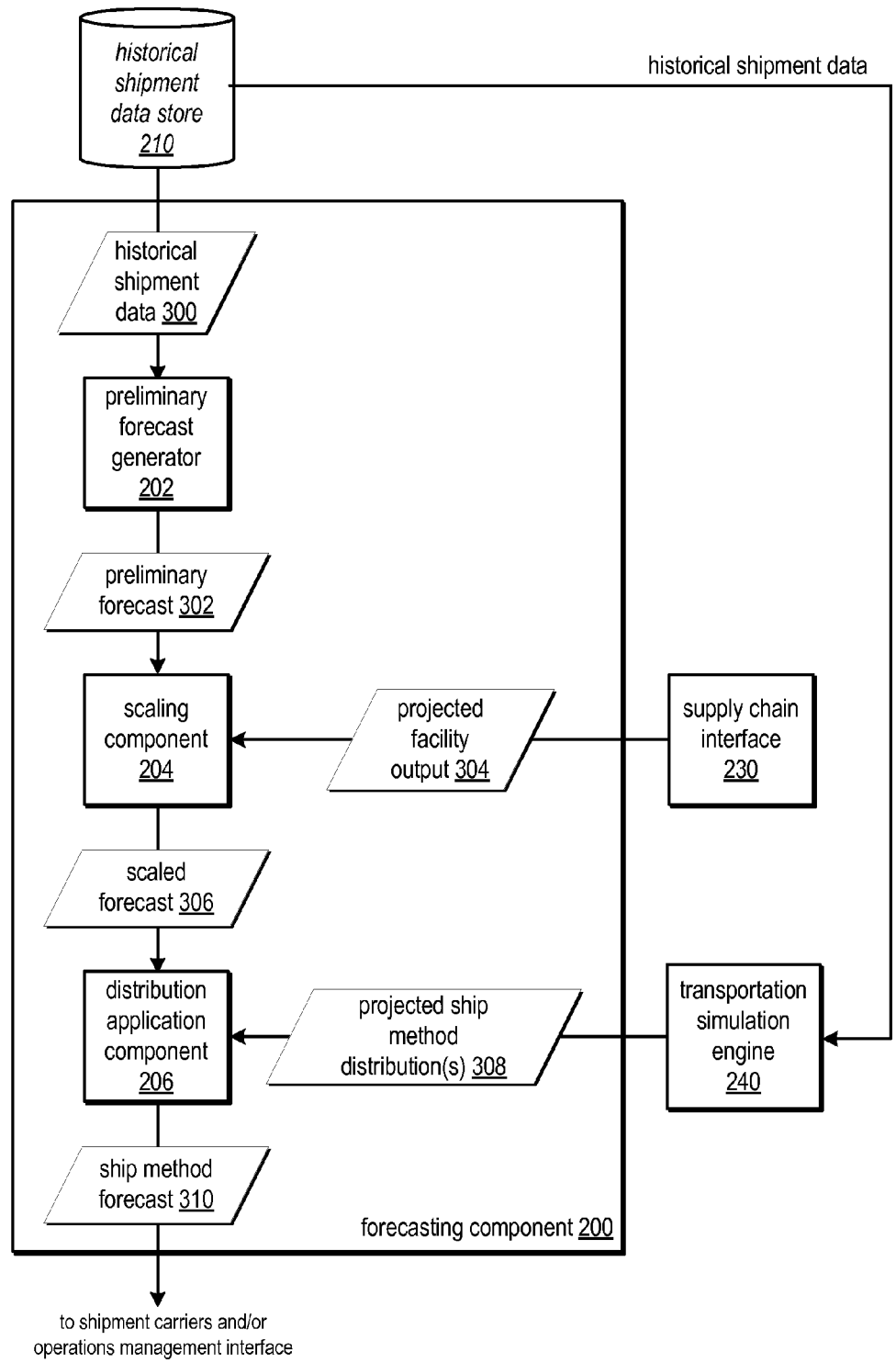
FIG. 3 illustrates an example flow diagram for creating ship method forecasts, according to some embodiments.
Figure 4:
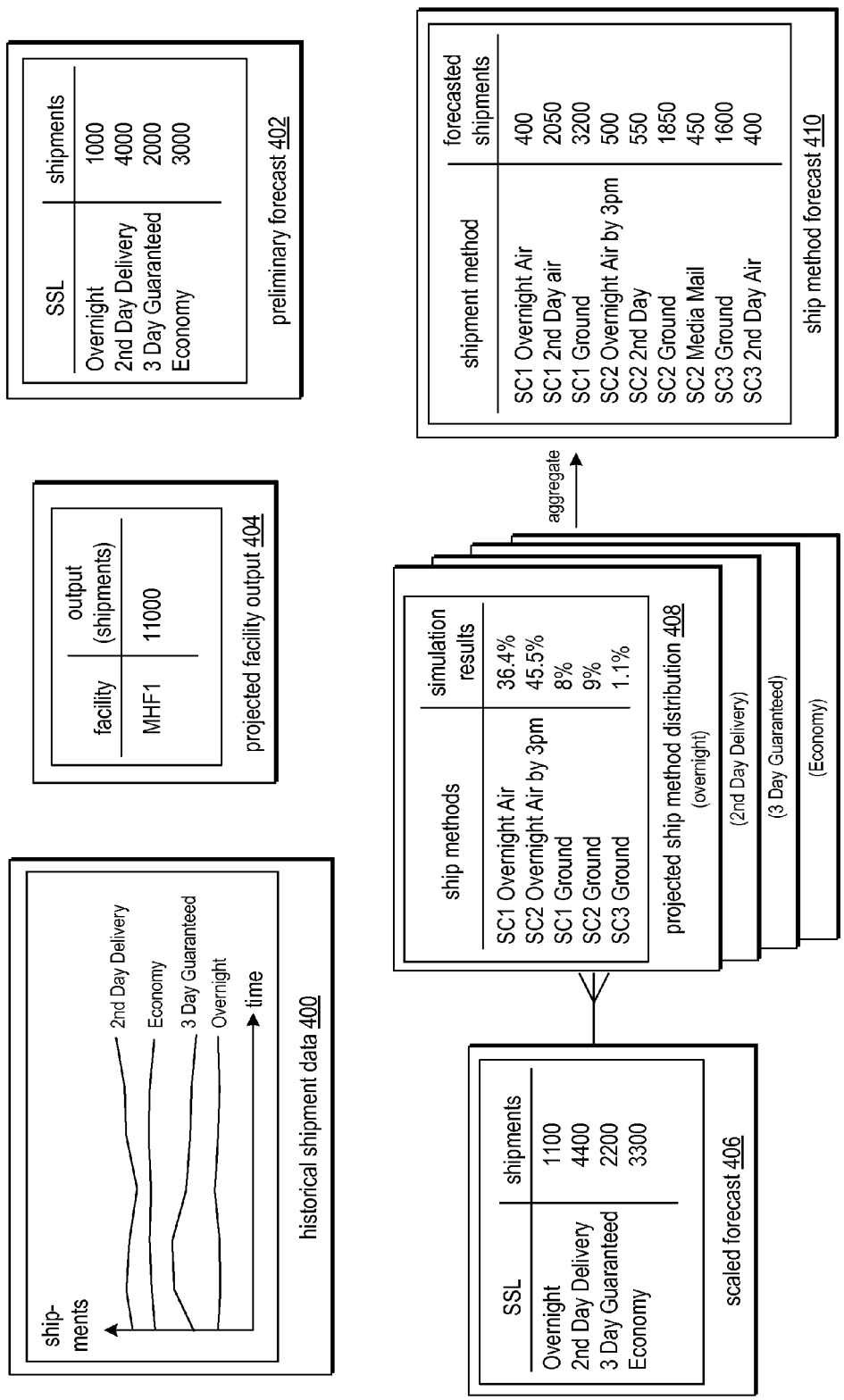
FIG. 4 illustrates example data structures utilized for creating ship method forecasts, according to some embodiments.

FIG. 3 illustrates an example data flow diagram that represents the generation of a ship method forecast, according to some embodiments. FIG. 4 illustrates non-limiting examples of the data elements described with respect to FIG. 3. FIG. 3 and FIG. 4 may be collectively described herein. It should be noted that the description of FIGS. 3 and 4 largely pertains to generating a ship method forecast specific to a particular materials handling facility. However, various embodiments may include performing multiple instances of the ship method forecast generation for multiple different materials handling facilities. Additionally, portions of ship method forecast generation may be described with respect to a particular time period (e.g., a single day); however, it should be understood that the techniques described herein may be performed for multiple time periods, such as a series of multiple days. Furthermore, while the granularity of the time periods is largely described at the level of a single day, it should be understood that the techniques described herein may be extended to encompass granularities of larger time periods (e.g., a week, month, year, etc.) as well as smaller time periods (e.g., hours, minutes, seconds, etc.). In the non-limiting examples of FIGS. 3 and 4, a ship method forecast 310 is specific to a particular materials handling facility and a particular day.

As demonstrated by the illustrated embodiment, preliminary forecast generator 202, scaling component 204 and distribution application component 206 may be components of forecasting component 200. In other cases, these components may be implemented as components distinct from forecasting component 200. Similarly, while supply chain interface 230 and transportation simulation engine 240 are illustrated as components distinct from forecasting component 200, these components may be implemented as part of forecasting component 200 in some embodiments.

As illustrated by historical shipment data 300, preliminary forecast generator 202 may be configured to receive historical shipment data from historical shipment data store 210. In various embodiments, historical shipment data may specify different shipment service levels as well as the quantity of shipments shipped according to those shipment service levels over time. In various embodiments, shipment service levels may be service levels offered to a customer, such as a customer that purchases an item to be shipped (e.g., an item purchased via an e-commerce portal). In one non-limiting example, a customer (or some other user) may specify a shipment service level at checkout time when ordering one or more items to be shipped. Examples of shipment service levels include overnight delivery (e.g., one-day delivery), second day delivery, three day guaranteed delivery, or economy shipping (e.g., ground shipping). In various embodiments, these shipment service levels may be provided at different costs to the consumer. For instance, an overnight shipment service level (e.g., overnight air shipping) may be more expensive than an economy shipment service level (e.g., free ground shipping). In some embodiments, shipment service levels may primarily differ by the time or deadline by which delivery of a respective shipment is promised. However, in some cases, shipment service levels may differ in other respects. For instance, in one embodiment, a "white glove" shipment service may differ from other shipment service levels by the manner in which shipments are to be handled. For instance, shipments (e.g., shipments including fragile or bulky items) shipped according to the requirements of a "white glove" service level may be handled with extra care or may include other services such as in-home installation.

One example of historical shipment data is illustrated by historical shipment data 400. In the illustrated embodiment, historical shipment data 400 includes a visual representation of the quantity of shipments shipped by a particular materials handling facility (e.g., materials handling facility 100) over period of time (e.g., over multiple days). In the example historical shipment data 400, a distinct set of historical shipment data is provided for each of multiple shipment service levels. The example shipment service levels include 2nd day delivery, economy, three day guaranteed and overnight. It should be understood that, in other cases, more, less, and/or different shipment service levels may be utilized. In various embodiments, historical shipment data may be received for any time period, such as time period from a previous week, month or year. Also note that while historical shipment data 400 is illustrated as graphical data, the same or similar data may be represented in tabular form or some other non-graphical manner.

In various embodiments, shipment service levels offered to customers may not be specific to any particular shipment carrier and/or shipment method provided by such carrier. For instance, a shipment that is to be shipped according to an overnight shipment service level may be shipped by multiple alternative shipment methods, such as a first shipment carrier's overnight air service, a second carrier's overnight air service, or even a ground shipping service of one of the carrier's. Unlike shipment service levels, a given shipment method may in various embodiments be specific to a shipment carrier. For instance, a first shipment carrier's overnight air service may be a different shipment method than a second carrier's overnight air service even though such services may be similar in nature.

Preliminary forecast generator 202 may be configured to apply any of a variety of techniques to historical shipment data 300 in order to generate a preliminary forecast 302. In various embodiments, preliminary forecast 302 may specify, for each of the shipment service levels offered by the materials handling facility for which the forecast is being generated, the quantity of shipments to be shipped from the materials handling facility according to that shipment service level during a particular time period. In the illustrated embodiment, this time period may be a particular day. In other embodiments, other granularities of time may be utilized (e.g., a week, month, etc.).

In some embodiments, preliminary forecast generator 202 may be configured to utilize a time series forecasting model to generate preliminary forecast 302. In one non-limiting example, preliminary forecast generator 202 may be configured to apply the Add-Winters time series forecasting model to historical shipment data 300 in order to generate preliminary forecast 302.

One example of preliminary forecast 302 is illustrated as preliminary forecast 402, which may be a preliminary forecast for a particular operating day of the materials handling facility for which the forecast is being generated. In the illustrated embodiments of FIG. 4, note that shipment service level is denoted as "SSL." Preliminary forecast 402 specifies, for each of four different shipment service levels, the corresponding quantity of shipments that are projected to be shipped by the materials handling facility in accordance with that shipment service level. As illustrated, these four shipment service levels include an overnight shipment service level, a second day delivery shipment service level, a three day guaranteed shipment service level as well as an economy shipment service level. It should be understood that, in other embodiments, different shipment service levels and/or different quantities of shipment service levels may be utilized. In the illustrated example, preliminary forecast 402 may indicate that 1000 overnight shipments are projected to be shipped from the materials handling facility on a particular day, 4000 second day delivery shipments are projected to be shipped from the materials handling facility on the particular day, 2000 three day guaranteed shipments are projected to be shipped from the materials handling facility on the particular day, and that 3000 economy shipments are projected to be shipped from the materials handling facility on the particular day.

Preliminary forecast generator 202 may be configured to provide preliminary forecast 302 to scaling component 204. Scaling component 204 may be configured to modify the preliminary forecast based on projected facility output 304. For instance, forecasting component 200 may be configured to receive projected facility output 304 from supply chain interface 230. In various embodiments, the projected facility output may be generated based on a variety of information, such as estimates or predictions based on historical sales data or predictions as to future sales. In general, projected facility output 304 may specify total or aggregate output of the materials handling facility for the particular time period being evaluated (e.g., for a particular business day or series of days). In various embodiments, projected facility output 304 may be specified in terms of units (e.g., units of items purchased by customers) or in terms of shipments (e.g., packages including one or more units). In cases where projected facility output 304 is expressed in terms of units, forecasting component may convert the projected facility output such that it is expressed in terms of packages (this process is described below with respect to later figures).

One non-limiting example of projected facility output 304 is illustrated as projected facility output 404. In the illustrated embodiment, the projected facility output specifies the materials handling facility for which the projected output applies. In this example, the data applies to "materials handling facility 1" (denoted as MHF1). The projected output for that facility is specified as 11,000 shipments. (In other cases, this value may be expressed in terms of units instead of shipments.) The illustrated data may specify that MHF1 is projected to ship 11,000 shipments total on a particular day (or week, or some other time period).

Scaling component 204 may be configured to utilize the projected facility output to modify preliminary forecast 302. In various embodiments, scaling component 204 may proportionately modify or scale the forecasted values of preliminary forecast 302 such that the sum of the forecasted values is equivalent to the sum of projected facility output 304. For example, the sum of the projected shipments of preliminary forecast 402 is 10,000 shipments; the projected facility output 404 is 11,000 shipments (i.e., 10% larger than the sum of the projected shipments of preliminary forecast 402). In order to proportionately modify the values of the preliminary forecast such that the sum of such values equals the projected facility output, scaling component 204 may be configured to increase each individual value of the preliminary forecast by 10%. In this way, the total quantity of shipments of the preliminary forecast may change (e.g., to match the projected facility output) while the projected shipments of each shipment level make up the same proportion of the total shipments as prior to scaling. The result of the above-described process is illustrated by scaled forecast 406. Note that each shipment service level's projection has been proportionately scaled by 10%. It should be understood that, in other embodiments, these values may be scaled differently dependent upon the preliminary forecast and/or the projected facility output.

The result of scaling the preliminary forecast is illustrated as scaled forecast 306. This forecast may in various embodiments be similar in structure to the preliminary forecast. The primary difference in some embodiments may be that the values of the scaled forecast have been scaled as described above. One example of a scaled forecast is illustrated as scaled forecast 406, the values of which each have been scaled upward by 10% (because the projected facility output is 10% larger than the sum of the preliminary forecast values). In various embodiments, scaling component 204 may provide scaled forecast 306 to distribution application component 206. Distribution application component 206 may be configured to apply projected shipment method distribution(s) 308 to scaled forecast 306 in order to generate ship method forecast 310.

Forecasting component 200 may be configured to receive one or more shipment method distributions 308 from transportation simulation engine 240. As described above, transportation simulation engine 240 may be configured to, for a given shipment (either an actual shipment or a hypothetical shipment) to be shipped from the materials handling facility, identify the shipment method (e.g., carrier and service) that is to be utilized to ship that shipment. The transportation simulation engine 240 may identify such shipment method according to a variety of techniques including but not limited to evaluating the shipment data (e.g., shipment service level selected for the shipments, shipment dimensions, shipment weight, shipment origin, shipment destination, delivery deadline, etc.) and/or evaluating information of various shipment carriers (e.g., e.g., carriers services, shipment costs, historical shipping performance of the carrier, etc.).

In various embodiments, transportation simulation engine 240 may be configured to store historical shipment carrier performance data. In various embodiments, historical shipment carrier performance data may specify, for a given type of shipment, a historical (e.g., average or median) transit period for delivering that type of shipment; the shipment type may be defined by shipment weight, dimensions, origin, destination, some other metadata about the shipment, or some combination thereof. In one non-limiting example, one type of shipment may be a small, medium-weight shipment originating in one zip code and destined for another zip code. The carrier performance data may specify, for a given carrier, historical transit times for delivering that type of shipment according to any of that carrier's shipment methods (e.g., overnight air, ground, etc.). In various embodiments, for a given shipment, transportation simulation engine 240 may select a shipment method (e.g., a combination of shipment carrier and shipment service provided by that carrier) capable of providing the shipment to its destination by the designated delivery deadline as indicated by the carrier performance data for that type of shipment. In cases where multiple shipment methods meet this criteria, the transportation may select one of such shipment method based on one or more criteria, such as cost. For example, when multiple shipment methods are suitable for the shipment, the transportation simulation engine 240 may select the shipment method that costs the least (e.g., least cost incurred by the merchant that operates the materials handling facility).

In various embodiments, costs and/or other variables of different shipment methods may change over time (e.g., due to contract negotiations between the merchant and shipment carriers). Transportation simulation engine 240 may base its operation on the most recent information for the possible shipment methods that may be selected for a shipment. Similarly, carrier availability and/or shipment methods offered by carriers may change over time. The information on which transportation simulation engine 240 bases its decisions may include up-to-date versions of carrier availability and/or shipment methods. Accordingly, for two shipments having the same parameters (e.g., weight, dimensions, destination, location, shipment service level, etc.) but shipped at different instances in time (e.g., one to be shipped a week before the other), the transportation simulation engine 240 may provide select different shipment methods for such shipments.

The transportation simulation engine 240 may apply the above-described functionality to a sample of multiple shipments. In some embodiments, this sample may be selected from a population of historical shipments (e.g., shipments from a prior week, month, or year). In one non-limiting example, transportation simulation engine may perform a simulation on 5,000 historical shipments. When performing a simulation, transportation simulation engine may apply the above-described techniques to each shipment of the sample in order to generate projected ship method distribution(s) 308. In various embodiments, transportation simulation engine may perform a simulation and generate a corresponding projected ship method distribution 308 for each shipment service level describe above.

Projected ship method distribution 408 may be one example of projected ship method distribution 308. As described above, such a distribution may be generated for each shipment service level. In various embodiments, the illustrated projected ship method distribution corresponds to the "overnight" shipment service level of scaled forecast 406. Similar distributions may be created for each of the other shipment service levels. However, for clarity of illustration, these distributions are not illustrated. In the illustrated embodiment, projected ship method distribution 408 specifies which ship methods are recommended for the 1100 overnight shipments of scaled forecast 406. For instance, the distribution specifies that 36.4% of the "overnight" shipment service level shipments are recommended to be sent by overnight air service provided by shipment carrier 1 (denoted as "SC1"). Similarly, 45.5% of the shipments are recommended to be shipped by "overnight air by 3 pm" service provided by shipment carrier 2 (denoted as "SC2"), 8% of the overnight shipment service level shipments are recommended to be shipped by SC1's ground service, 9% of the overnight shipment service level shipments are recommended to be shipped by SC2's ground service, and 1.1% of the overnight shipment service level shipments are to be shipped by ground service of shipment carrier 3 (denoted as "SC3").

In various embodiments, distribution application component 206 may be configured to generate ship method forecast 310 by applying projected ship method distribution(s) 308 to scaled forecast 306. In various embodiments, this may include distribution application component 206 determining the quantity of shipment that are projected to be shipped by each shipment method by multiplying the distribution percentage of that ship method by the corresponding value from the scaled forecast. For example, for projected ship method distribution 408, the quantity of shipments to be processed by the "SC1 Overnight Air" ship method may be determined by multiplying 36.4% (or 0.364) by 1100 shipments (the corresponding value of scaled forecast 406). In this example, the result is 400 shipments. This process may be repeated for each projected ship method distribution and each ship method specified by those distributions. The distribution application component 206 may aggregate (e.g., via summation) these results to create ship method forecast 310. One example of ship method forecast 310 is illustrated as ship method forecast 410. In the illustrated embodiment, ship method forecast specifies multiple ship methods that are projected to be utilized in a given day as well as respective quantities of shipments that are projected to be processed by each shipment method. As illustrated, the shipment forecasts generated by the forecasting component 200 may be provided to one or more shipment carriers and/or one or more operations management interfaces, such as those described above with respect to FIG. 2. As described above, shipment carriers and/or management entities of materials handling facilities may use such forecasts for planning purposes (e.g., to plan for needed quantities of vehicles or personnel).

Example Methods

Embodiments of the system and method for generating shipment forecasts for materials handling facilities may include various methods, such as that of FIGS. 5-6 described below. In various embodiments, methods may be implemented on a computer system, such as that of FIG. 7 described below. In various embodiments, the methods described herein may be performed by forecasting component 200 described above, which may also be implemented on a computer system, such as that of FIG. 7 described below.

Figure 5A:
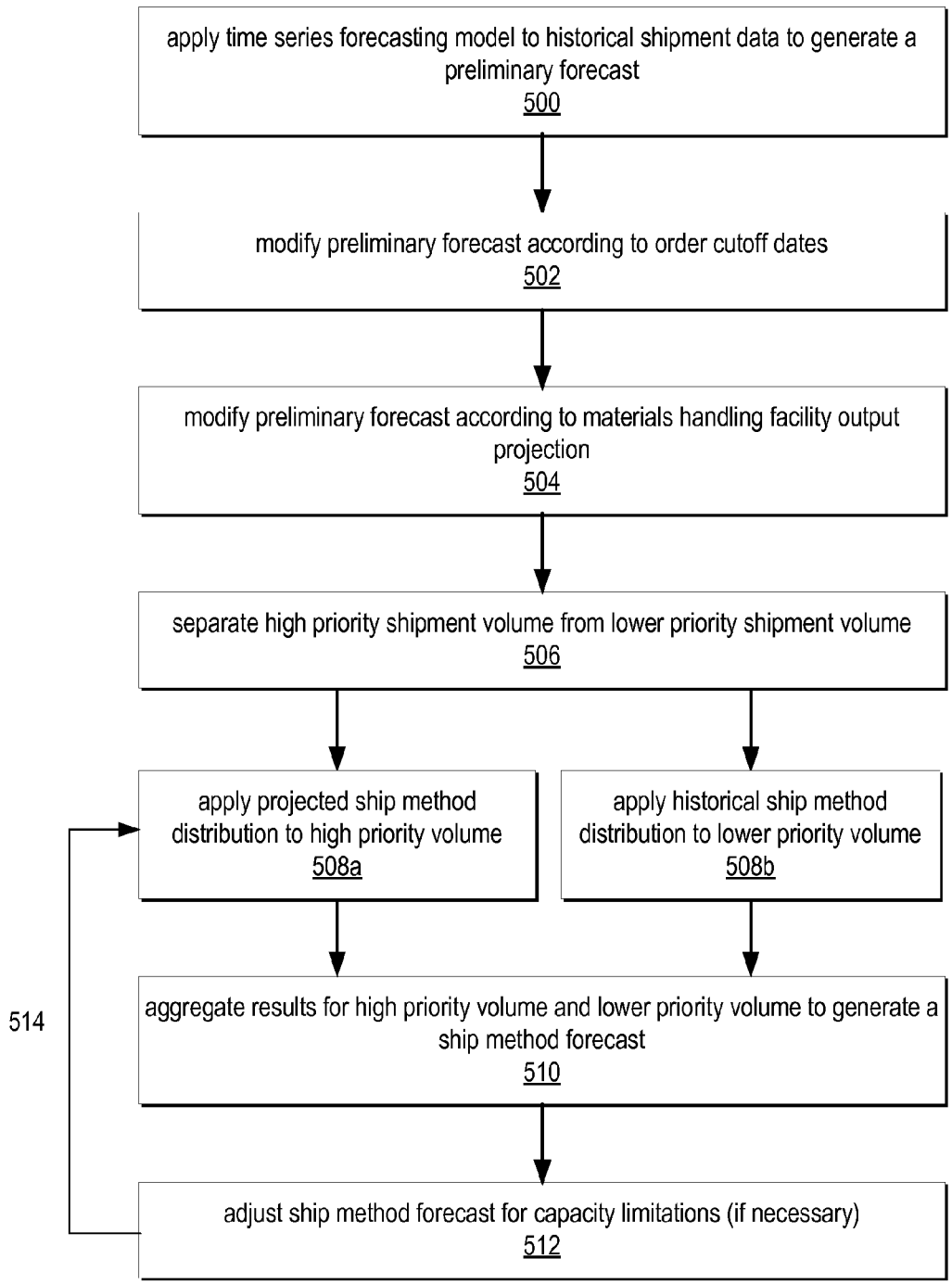
FIGS. 5A-5B illustrates a flowchart of an example method generating a ship method forecast during periods of peak shipment output, according to some embodiments.

FIG. 5A illustrates a flowchart of an example method for generating ship method forecasts, according to some embodiments. In some cases, the illustrated method may be utilized during periods of high shipment volume (e.g., December). As illustrated by block 500, the method may include applying a time series forecasting model to historical shipment data to create a preliminary forecast. One example of historical shipment data is described above with respect to historical shipment data 300 and 400. For instance, this may include utilizing the techniques described above with respect to the preliminary forecast generator in order to apply a time series forecasting model to historical shipment data. In some cases, prior to applying the model to the historical data, the historical data may be conditioned to remove irregularities, such as irregularities due to holidays or other days in which shipment activity of a materials handling facility is artificially low. For instance, historical shipment data corresponding to a first week that includes a holiday may be substituted with data of another week that is temporally proximate to that first week (e.g., the week preceding the holiday week). The result of block 500 may be a preliminary forecast, such as preliminary forecasts 302 and 402 described above.

As illustrated by block 502, the method may include modifying the preliminary forecast according to order cutoff dates. In various embodiments, an order cutoff date may be the date at which customers may no longer use a particular shipment service level (e.g., ground shipping) to receive a shipment by a given priority date (e.g., the day preceding a major holiday). In some cases, historical trends may indicate that order activity for shipments shipped according to a particular shipment service level may peak on such cutoff dates. Accordingly, this portion of the method may modify the preliminary forecast to increase volumes of shipments sent according to that particular shipment service level on a cutoff date.

As illustrated by block 504, the method may include modifying the preliminary forecast according to a materials handling output projection. One example of such a projection is described above with respect to projected facility output data 304 and 404. This portion of the method may include utilizing the techniques described above with respect to the scaling component. For instance, the method may include proportionately modifying or scaling the values of the preliminary forecast such that the sum of such values is the same as the projected facility output. One example of this technique is described above with respect to generating scaled forecast 406 from preliminary forecast 402 and projected facility output 404. In some embodiments, the projected facility output may be expressed in terms of units instead of packages. In these cases, the method may include converting the facility output value from units to packages. For instance, the method may include dividing the output value (in units) by a historical average quantity of units known to reside in the packages processed by the relevant materials handling facility. For instance, if the projected facility output value were 10,000 units and the historical average number of units per package were 2, the method may include dividing the units per package value into the projected facility output value to determine that the projected facility output in terms of packages is 500.

As illustrated by block 506, the method may include separating high priority shipment volume from lower priority shipment volume. In various embodiments, different shipments may have different shipment delivery deadlines. In some cases, the method may include designating shipments that are to be delivered by a certain deadline (e.g., the day before a major holiday) as being high priority shipments whereas shipments that are to be delivered after that deadline are designated with a lower priority.

For high priority shipment volume, as illustrated by block 508a, the method may include applying a projected ship method distribution to those shipments. This process may be similar to the techniques performed by distribution application component 206 described above (e.g., utilizing a simulation to generate such distribution as well as applying such distribution). For lower priority shipment volume, as illustrated by block 508b, the method may include applying a historical ship method distribution to those shipments. This historical ship method distribution may be determined by determining the different shipment methods utilized by the materials handling facility during a past period of time (e.g., a week occurring one month ago). While determined in a different manner, this distribution may be similar to projected ship method distributions 308 and 408 described above. Both 508a and 508b may result in ship method forecasts similar to ship method forecasts 310 and 410 described above. As illustrated by block 510, these forecasts may be aggregated (e.g., combined) to generate the complete ship method forecast.

In various embodiments, the method may include adjusting the ship method forecast for capacity limitations if necessary (e.g., if the ship method forecast suggests a ship method be utilized beyond its capacity). For instance, if a ship method forecast projects that 10,000 shipments are to be shipped according to a particular shipment carrier's ground shipment method and the threshold capacity of that shipment method is only 9,000 shipments, the method may include assigning 9,000 shipments to that shipment method and performing blocks 508a-512 again without consideration of those 9,000 shipments nor the shipment method to which they are assigned (as illustrated at 514). In this way, the remaining 1,000 shipments may be assigned to another shipment method. The new forecast generated by repeating blocks 508a-512 may be aggregated with the information that specifies the 9,000 shipments are assigned to their corresponding ship method. This aggregation may result in an updated shipment method forecast similar to those described above.

Figure 5B:
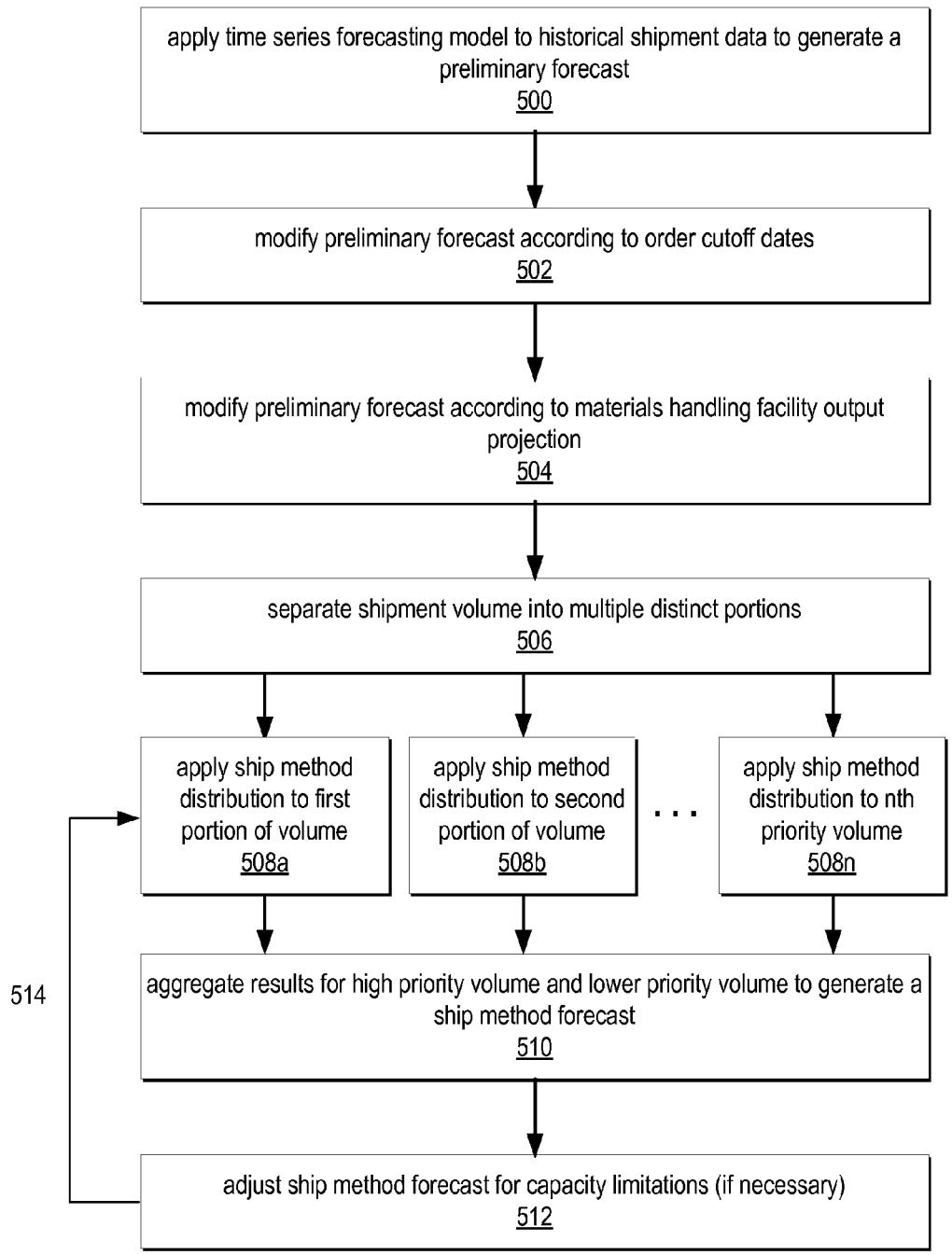

FIG. 5B illustrates a method similar to that of FIG. 5A that may be extended to any number of distinct portions of shipment volume. In FIG. 5B, items 500-504 may be similar to those described above with respect to FIG. 5A. In various embodiments, the method may include separating shipment volume into multiple distinct portions (block 506). In some embodiments, this portion of the method may include separating shipment volume on the basis of priority designation (e.g., high priority, low priority, etc.), shipment origin, shipment destination, or any other shipment characteristics. As illustrated by 508a-n, the method may include applying a ship method distribution to each different portion of shipment volume. In some cases, some or all of the ship method distributions may be the same. Likewise, in some cases, some or all of the ship method distributions may be different. In various embodiments, some of the ship method distributions may be projected or forecasted distributions, such as those generated by transportation simulation engine 240 described above. In some cases, some of the ship method distributions may be historical distributions based on historical data, such as data from historical shipment data store 210. In general, any type of ship method distribution described herein may be applied to any given portion of shipment volume in various embodiments. The portions of the method corresponding to blocks 510-514 may be similar to those described above with respect to FIG. 5A. While not illustrated, the techniques described above with respect to FIG. 5B may also be applied to the example method of FIG. 6 described below.

Figure 6:
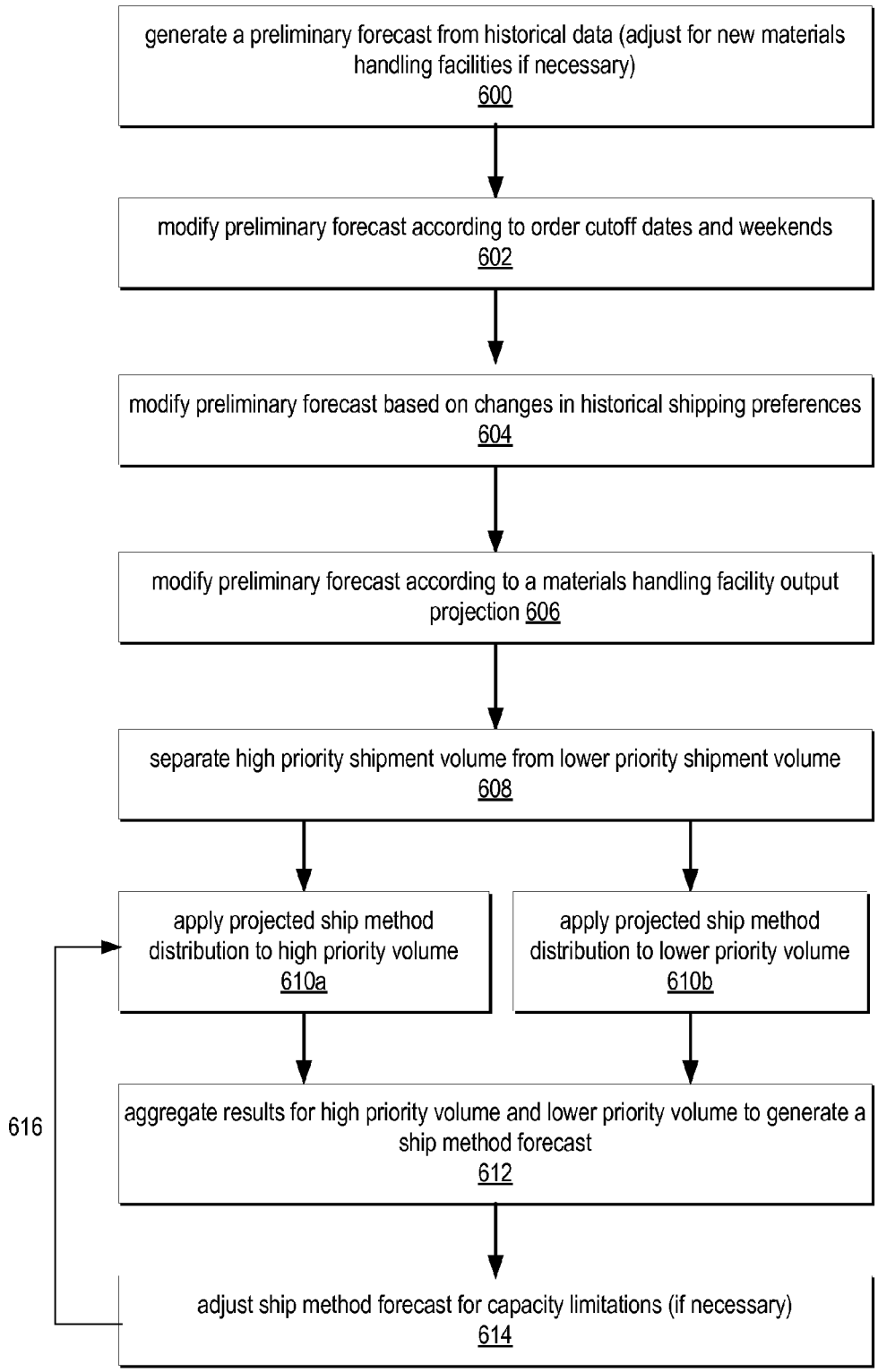
FIG. 6 illustrates a flowchart of an example method for generating a ship method forecast for a distant period of time, according to some embodiments.

FIG. 6 illustrates a flowchart of an example method for generating ship method forecasts, according to some embodiments. In some cases, the illustrated method may be utilized to generate long-term forecasts. As illustrated by block 600, the method may include generating a preliminary forecast from historical data. For example, the method may include determining the percentages of shipment service level utilization during a particular month of a previous year. Note that in various embodiments, this technique may be utilized instead of the time series forecast model described above. In various embodiments, the result of block 600 may be similar to preliminary forecast 302 and 402 described above, with the exception that shipment forecasts may be expressed as percentages instead of absolute quantities. For instance, 1,000 overnight shipments out of 10,000 total shipments would instead by expressed as 10% of the overall shipment service levels, according to some embodiments.

In cases where there is not sufficient historical data available on which to base the creation of a preliminary forecast (e.g., in cases where a relatively new materials handling facility is being evaluated), the method may include utilizing historical data about a similar materials handling facility in order to perform the method. For instance, a similar materials handling facility may be identified based on one or more criteria (e.g., location, unit or shipment throughput, etc.); the historical data for that materials handling facility may be utilized to perform the method in some embodiments.

As illustrated by block 602, the method may include modifying the preliminary forecast according to order cutoff dates, holidays, and/or weekends. Modifying the data according to cutoff dates and/or holidays may be performed in manner similar to that described above with respect to FIG. 5A. To adjust for weekends, the method may include shifting the historical data evaluated by one or two days to avoid evaluating days on which the materials handling facility is not operating (e.g., weekends).

As illustrated by block 604, the method may include modifying the preliminary forecast based on changes in historical shipping preferences. For example, if the two-day shipment service level (or any other shipment service level) is currently 10% more popular than previous years, the method may include adjusting the preliminary forecast to reflect such shift in customer preferences. For instance, the value corresponding to the two-day shipment service level in the preliminary forecast may be increased by 10% in order to take such shift into consideration.

As illustrated by block 606, the method may include modifying the preliminary forecast according to a materials handling facility output projection. This portion of the method may be performed in a manner similar to that described above with respect to FIG. 5A. Similarly, the separation of high priority volume and lower priority volume, as illustrated at block 608, may also be performed in a manner similar to that described above with respect to FIG. 5A.

As illustrated by blocks 610*a* and 610*b*, the method may include separately applying ship method distributions to both high priority shipment volume and lower priority shipment volume. In various embodiments, applying ship method distributions to either volume may include performing techniques similar to those described above with respect to distribution application component 206 and/or block 508*a* described above. Both 610*a* and 610*b* may result in ship method forecasts similar to ship method forecasts 310 and 410 described above. As illustrated by block 612, these forecasts may be aggregated (e.g., combined) to generate the complete ship method forecast. As illustrated by blocks 614-616, the method may also include adjusting the ship method forecast in accordance with any known ship method capacity limitation (similar to blocks 512-514 described above).

Example Computer System

Various embodiments of the system and method for generating shipment forecasts for materials handling facilities, as described herein, may be executed on one or more computer systems, which may interact with various other devices. Note that any component, action, or functionality described above with respect to FIGS. 1-6 may be implemented via one or more computer systems configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 implementing forecasting component 200 are shown stored within program instructions 722. Additionally, data 732 of memory 720 may store any of the information or data structures described above, such as historical shipment data 300 and/or ship method forecast 310. In some embodiments, program instructions and/or data may be received, sent or stored upon different types of computer-accessible media or on similar media separate from system memory 720 or computer system 700. While computer system 700 is described as implementing the functionality of forecasting component 200, any of the components or systems illustrated above may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices (e.g., any other component of the Figures described above) attached to a network 785 or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
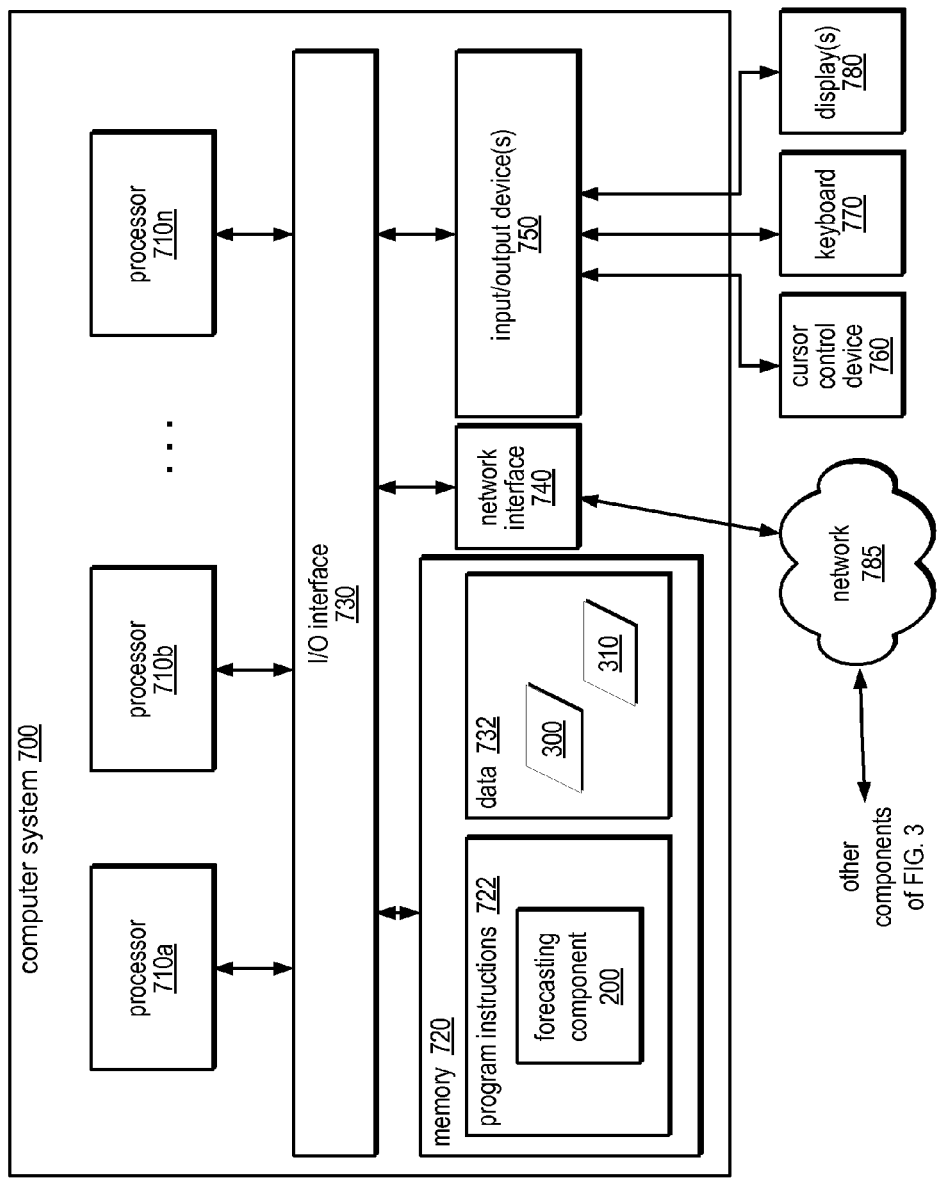
FIG. 7 illustrates one example of a computer system suitable for implementing various elements of the system and method for generating shipment forecasts for materials handling facilities, according to some embodiments.

As shown in FIG. 7, memory 720 may include program instructions 722 configured to implement any element or action described above. In one embodiment, the program instructions may implement the methods described above, such as the methods illustrated by FIGS. 5-6. In other embodiments, different elements and data may be included. Note that data 732 may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:

a memory; and one or more processors coupled to the memory, wherein the memory comprises program instructions executable by the one or more processors to implement a forecasting component configured to:

for each of multiple different shipment service levels offered to customers, generate a projection of the quantity of shipments that will be shipped from a materials handling facility according to that shipment service level during a particular time period, wherein a different respective projection is generated for each of the multiple different shipment service levels;

based on an aggregate quantity of shipments projected to be shipped from the materials handling facility during the particular time period, modify the projected quantities of shipments for the multiple shipment service levels to provide a different respective modified projected quantity of shipments for each shipment service level;

for each shipment service level, receive information specifying a distribution of different shipment methods that are projected to be utilized during the particular time period in order to meet requirements of that shipment service level, wherein a different respective distribution is received for each different respective service level; and based on the respective distribution for each different respective shipment service level and the respective modified projected quantity of shipments for each shipment service level, generate a forecast, wherein said forecast specifies respective quantities of shipments that are to be shipped during the particular time period according to each of the different shipment methods.

2. The system of claim 1, wherein one or more of the multiple different shipment service levels include one or more of: a one-day shipment service level, a two-day shipment service level, or an economy shipment service level.

3. The system of claim 1, wherein to generate a given projection of the quantity of shipments that will be shipped from the materials handling facility according to a given shipment service level, the forecasting component is configured to:

utilize a time series forecasting model to generate the given projection from historical data.

4. The system of claim 1, wherein the forecasting component is configured to generate said aggregate quantity of shipments projected to be shipped from the materials handling facility, wherein to generate said aggregate quantity of shipments, the forecasting component is configured to:

receive information specifying a historical average of a quantity of units per shipment processed by the materials handling facility;

receive information specifying an aggregate quantity of units projected to be processed by the materials handling facility during the particular time period; and divide said aggregate quantity of units by the historical average of the quantity of units per shipment to generate said aggregate quantity of shipments.

5. The system of claim 1, wherein to modify the projected quantities of shipments for the multiple shipment services levels based on said aggregate quantity of shipments, the forecasting component is configured to:

proportionately modify the projected quantities such that a summation of the projected quantities is equivalent to said aggregate quantity of shipments.

6. The system of claim 1, wherein the distribution of different shipment methods for a given shipment service level indicates, for each different shipment method, a projection of a frequency with which that shipment method will be utilized to ship shipments of the given shipment service level relative to a projection of the frequencies with which other shipment methods will be utilized to ship shipment of the given shipment service level.

7. The system of claim 1, wherein said distribution of different shipment methods that are projected to be utilized comprises a distribution of different shipment methods utilized to ship shipments of a particular priority designation, and wherein said respective forecast comprises a forecast specific to the shipments of the particular priority designation.

8. The system of claim 1, wherein said multiple different shipment service levels are not specific to any particular shipment carrier, wherein at least some of said different shipment methods are specific to a respective shipment carrier.

9. The system of claim 7, wherein the forecasting component is configured to:

for a particular shipment method, determine that said forecast specifies a quantity of shipments that exceeds a threshold capacity for that shipment method; and generate a second forecast for the shipments of the particular priority designation; wherein the generation of the second forecast excludes from consideration, the particular shipment method and any shipments assigned to the particular shipment method.

10. A method, comprising:

performing, by one or more computing devices:

for each of multiple different shipment service levels offered to customers, generating a projection of the quantity of shipments that will be shipped from a materials handling facility according to that shipment service level during a particular time period, wherein a different respective projection is generated for each of the multiple different shipment service levels;

based on an aggregate quantity of shipments projected to be shipped from the materials handling facility during the particular time period, modifying the projected quantities of shipments for the multiple shipment service levels to provide a different respective modified projected quantity of shipments for each shipment service level;

for each shipment service level, receiving information specifying a distribution of different shipment methods that are projected to be utilized during the particular time period in order to meet requirements of that shipment service level, wherein a different respective distribution is received for each different respective service level; and;

based on the respective distribution for each different respective shipment service level and the respective modified projected quantity of shipments for each shipment service level, generating a forecast, wherein said forecast specifies respective quantities of shipments that are to be shipped during the particular time period according to each of the different shipment methods.

11. The method of claim 10, wherein one or more of the multiple different shipment service levels include one or more of: a one-day shipment service level, a two-day shipment service level, or an economy shipment service level.

12. The method of claim 10, wherein generating a given projection of the quantity of shipments that will be shipped from the materials handling facility according to a given shipment service level comprises:
   utilizing a time series forecasting model to generate the given projection from historical data.

13. The method of claim 10, wherein the method comprises generating said aggregate quantity of shipments projected to be shipped from the materials handling facility, wherein said generating comprises:
   receiving information specifying a historical average of a quantity of units per shipment processed by the materials handling facility;
   receiving information specifying an aggregate quantity of units projected to be processed by the materials handling facility during the particular time period; and
   dividing said aggregate quantity of units by the historical average of the quantity of units per shipment to generate said aggregate quantity of shipments.

14. The method of claim 10, wherein modifying the projected quantities of shipments for the multiple shipment services levels based on said aggregate quantity of shipments comprises:
   proportionately modifying the projected quantities such that a summation of the projected quantities is equivalent to said aggregate quantity of shipments.

15. The method of claim 10, wherein the distribution of different shipment methods for a given shipment service level indicates, for each different shipment method, a projection of a frequency with which that shipment method will be utilized to ship shipments of the given shipment service level relative to a projection of the frequencies with which other shipment methods will be utilized to ship shipment of the given shipment service level.

16. The method of claim 10, wherein said shipments of a particular priority designation comprise shipments that are expected to be delivered by a particular delivery deadline.

17. The method of claim 10, wherein said distribution of different shipment methods that are projected to be utilized comprises a distribution of different shipment methods utilized to ship shipments of a particular priority designation, and wherein said respective forecast comprises a forecast specific to the shipments of the particular priority designation.

18. The method of claim 17, comprising:
   for a particular shipment method, determining that said forecast specifies a quantity of shipments that exceeds a threshold capacity for that shipment method; and
   generating a second forecast for the shipments of the particular priority designation; wherein the generation of the second forecast excludes from consideration, the particular shipment method and any shipments assigned to the particular shipment method.

19. A non-transitory computer-readable storage medium, storing program instructions computer-executable on a computer system to implement a forecasting component configured to:
   for each of multiple different shipment service levels offered to customers, generate a projection of the quantity of shipments that will be shipped from a materials handling facility according to that shipment service level during a particular time period, wherein a different respective projection is generated for each of the multiple different shipment service levels;
   based on an aggregate quantity of shipments projected to be shipped from the materials handling facility during the particular time period, modify the projected quantities of shipments for the multiple shipment service levels to provide a different respective modified projected quantity of shipments for each shipment service level;
   for each shipment service level, receive information specifying a distribution of different shipment methods that are projected to be utilized during the particular time period in order to meet requirements of that shipment service level, wherein a different respective distribution is received for each different respective service level
   based on the respective distribution for each different respective shipment service level and the respective modified projected quantity of shipments for each shipment service level, generate a forecast, wherein said forecast specifies respective quantities of shipments that are to be shipped during the particular time period according to each of the different shipment methods.

20. The non-transitory computer-readable storage medium of claim 19, wherein one or more of the multiple different shipment service levels include one or more of: a one-day shipment service level, a two-day shipment service level, or an economy shipment service level.

21. The non-transitory computer-readable storage medium of claim 19, wherein to generate a given projection of the quantity of shipments that will be shipped from the materials handling facility according to a given shipment service level, the forecasting component is configured to:
   utilize a time series forecasting model to generate the given projection from historical data.

22. The non-transitory computer-readable storage medium of claim 19, wherein the forecasting component is configured to generate said aggregate quantity of shipments projected to be shipped from the materials handling facility, wherein to generate said aggregate quantity of shipments, the forecasting component is configured to:
   receive information specifying a historical average of a quantity of units per shipment processed by the materials handling facility;
   receive information specifying an aggregate quantity of units projected to be processed by the materials handling facility during the particular time period; and
   divide said aggregate quantity of units by the historical average of the quantity of units per shipment to generate said aggregate quantity of shipments.

23. The non-transitory computer-readable storage medium of claim 19, wherein to modify the projected quantities of shipments for the multiple shipment services levels based on said aggregate quantity of shipments, the forecasting component is configured to:
   proportionately modify the projected quantities such that a summation of the projected quantities is equivalent to said aggregate quantity of shipments.

24. The non-transitory computer-readable storage medium of claim 19, wherein the distribution of different shipment methods for a given shipment service level indicates, for each different shipment method, a projection of a frequency with which that shipment method will be utilized to ship shipments of the given shipment service level relative to a projection of the frequencies with which other shipment methods will be utilized to ship shipment of the given shipment service level.

25. The non-transitory computer-readable storage medium of claim 19, wherein said distribution of different shipment methods that are projected to be utilized comprises a distribution of different shipment methods utilized to ship shipments of a particular priority designation, and wherein said respective forecast comprises a forecast specific to the shipments of the particular priority designation.

26. The non-transitory computer-readable storage medium of claim 19, wherein said multiple different shipment service levels are not specific to any particular shipment carrier, wherein at least some of said different shipment methods are specific to a respective shipment carrier.

27. The non-transitory computer-readable storage medium of claim 25, wherein the forecasting component is configured to:

for a particular shipment method, determine that said forecast specifies a quantity of shipments that exceeds a threshold capacity for that shipment method; and generate a second forecast for the shipments of the particular priority designation; wherein the generation of the second forecast excludes from consideration, the particular shipment method and any shipments assigned to the particular shipment method.

* * * * *